UNITED STATES PATENT OFFICE.

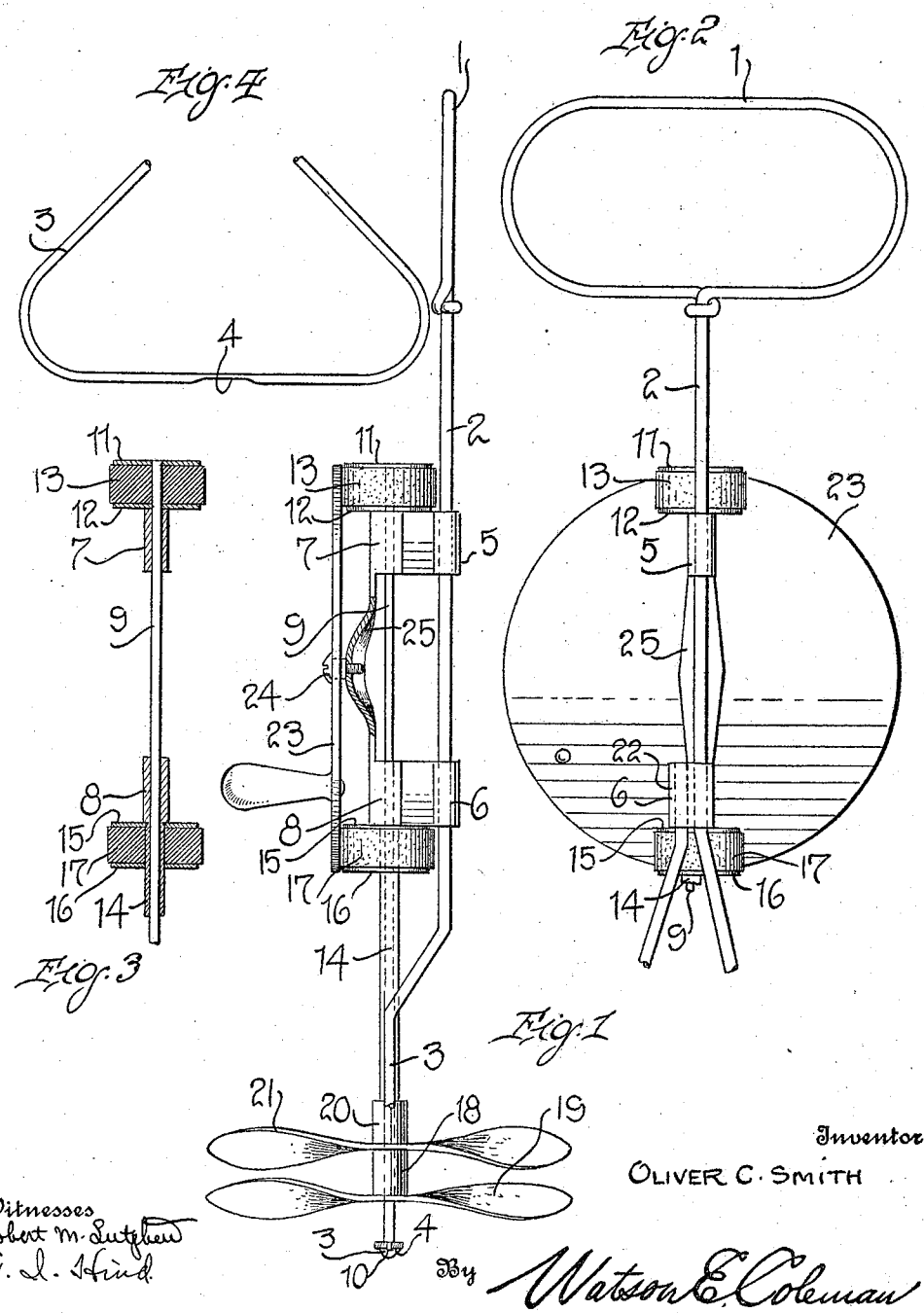

OLIVER C. SMITH, OF CINCINNATI, OHIO, ASSIGNOR OF ONE-HALF TO EDWIN H. ELLIS, OF CINCINNATI, OHIO.

EGG-BEATER.

1,145,275.  Specification of Letters Patent.  Patented July 6, 1915.

Application filed April 25, 1914. Serial No. 834,409.

*To all whom it may concern:*

Be it known that I, OLIVER C. SMITH, a citizen of the United States, residing at Cincinnati, in the county of Hamilton and State of Ohio, have invented certain new and useful Improvements in Egg-Beaters, of which the following is a specification, reference being had to the accompanying drawings.

This invention relates to combined egg beaters and cream whippers.

The object of the invention is to provide an article of this character, which in use will be thoroughly efficient for beating eggs or whipping cream, the beater heads being so disposed and operated as to cause the lower one to throw the eggs being beaten upward, and the upper one to throw the eggs downward, thereby causing a circular cutting and beating motion at the same time, which will effect the reduction of the eggs to a stiff froth in the shortest possible time.

A further object of the invention is to provide such an article in which the employment of gears is eliminated, thus to prevent noise, and in which the parts are so assembled that there will be no possibility of their working loose from long continued use, and whereby, further, no lost motion will result.

With the above and other objects in view, as will appear as the nature of the invention is better understood, the same consists in the novel construction and combination of parts of a combined egg beater and cream whipper as will be hereinafter fully described and claimed.

In the accompanying drawings forming a part of this specification, and in which like characters of reference designate corresponding parts: Figure 1 is a view in side elevation, partly in section, of an egg beater constructed in accordance with the present invention; Fig. 2 is a view in side elevation, the bottom portion of the frame being broken away; Fig. 3 is a sectional detail view through a part of the device, and Fig. 4 is a detail sectional view of the lower portion of the frame omitted in Fig. 2.

The frame or handle of the machine is constructed from a length of stiff wire, and is bent to provide a hand-hold 1, a shank 2 and a head 3, the latter being of approximately triangular form, and has its base member inset at 4 whereby to prevent contact between the bottom of the dish and the beater shaft, when the article is in use. Rigidly secured upon the shank are two brackets 5 and 6, each of which is provided at the end opposite that to which it is attached to the shank with a bearing 7 and 8, respectively, and in these two bearings is journaled a shaft 9, which projects at its upper end above the bracket 5, and which at its lower end is provided with a pintle 10 to engage a seat in the inset portion 4 of the base. Secured to the shaft 9 above the bracket 5 are two disks 11 and 12, and arranged between these and mounted upon the shaft is a friction wheel 13, preferably of rubber. Mounted upon the shaft 9 below the bracket 6 is a tubular shaft 14 the upper end of which has secured to it two disks 15 and 16, and arranged between these and mounted upon the shaft is a friction wheel 17 preferably of rubber. The lower end of the shaft 9 carries a collar 18 to the under side of which is secured a beater head 19, and rigidly secured to the lower end of the shaft 14 is a similar collar 20 to which is secured a second beater head 21. These beater heads are of propeller blade shape, and under rapid rotation the lower head will lift the egg or cream, while the upper will force it downward, thereby obtaining a rapid circulation and an effective frothing of the substance.

The bracket 6 is provided with a lateral extension 22 in which is secured the free end of the head 3, and by this means the head is caused to retain its shape, and be effective in resisting compression due to pressure on the hand-hold 1 when the device is in operation. The two friction wheels 13 and 17 engage with a driving member, preferably a metal friction disk 23, which is journaled upon an adjusting screw 24 that passes through the disk and has its inner end threaded through a plate 25; it may be secured at its ends to the brackets 5 and 6, but is preferably integral therewith the center portion of the plate being bulged outward so as to provide proper clearance between the inner end of the screw and the shaft 9. By this simple arrangement, the actuating disk may be adjusted to compensate for wear of the friction wheels, thus at all times to assure such contact between the parts as will result in the positive driving of the beater heads.

Attention is particularly called to the peculiar shape of the supporting member formed by the supporting strip 25 and the brackets 5 and 6. It will be seen that the strip 25 is formed with ears, which ears are bent around to form bearings 5 and 7 and the bearings 6 and 8, and that the bearing 6 which embraces the handle rod 2 also embraces the free end of the triangular head 3 and holds it in engagement with the body of the rod.

It will be noted that among the advantages incident to my construction is the fact that the disk 23 may be readily removed for washing or to permit the replacement of the gear wheels and further that by using the friction wheels and a friction disk I avoid the necessity of using toothed gears, which are liable to clog or become dirty and are very difficult to clean.

The structure as a whole is exceedingly simple in construction, may readily be manufactured and will be found to combine all the advantages of the ordinary gear egg beater without any of the disadvantages of the latter.

Having thus described my invention, what I claim is:

In an egg beater, a handle rod bent at its lower end to form a triangular head, said head being deflected at its lower portion out of the plane of the handle rod, a shaft extending parallel to the handle rod and having a bearing at its lower end in said head, means for supporting said shaft upon the handle rod comprising a strip of metal extending parallel to the handle rod and having ears formed at its upper end, the opposite extremities of said ears being bent around said shaft and around the handle rod, respectively, the lower end of the strip being also formed with ears, one of which is bent to surround said shaft and the other of which is extended rearward and bent to embrace the handle rod and the free end of the triangular head, a hollow shaft surrounding the lower end of the first named shaft, beaters carried each by one of said shafts, a gear wheel carried by the upper end of each of said shafts, and a driving gear wheel mounted upon the connecting member and engaging both of said gear wheels to rotate the shafts in opposite directions.

In testimony whereof I hereunto affix my signature in the presence of two witnesses.

OLIVER C. SMITH.

Witnesses:
HENRY C. SHURTS,
EDW. HANENSCHILD.

Copies of this patent may be obtained for five cents each, by addressing the "Commissioner of Patents, Washington, D. C."